Aug. 15, 1961  F. M. MATHENY  2,996,085
APPARATUS FOR LINING PIPELINES
Original Filed July 20, 1956  2 Sheets-Sheet 1
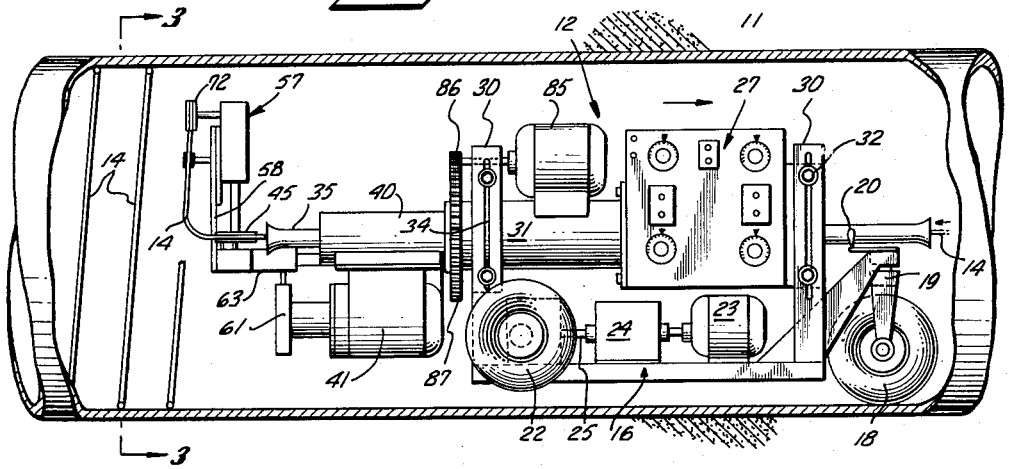
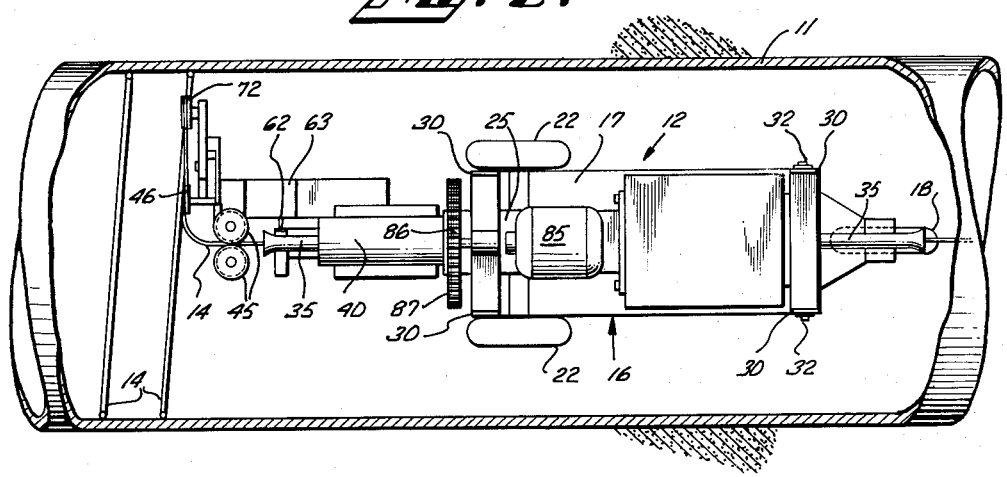
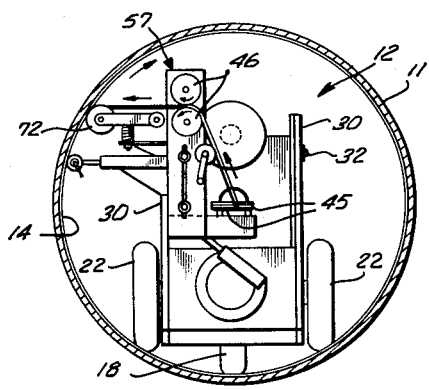
INVENTOR.
FRANCIS M. MATHENY
BY
Mason & Graham
ATTORNEYS.

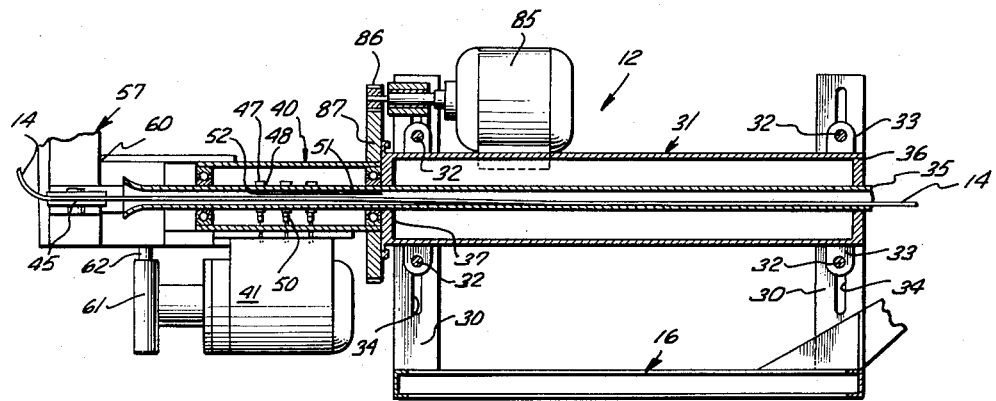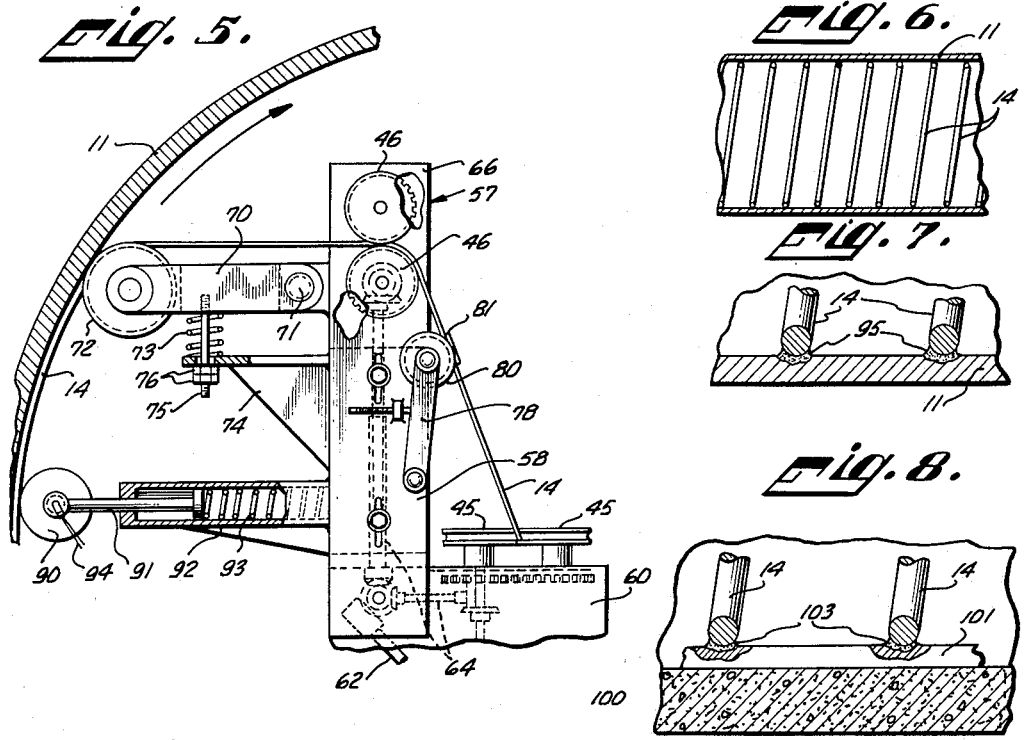

United States Patent Office 2,996,085
Patented Aug. 15, 1961

2,996,085
APPARATUS FOR LINING PIPELINES
Francis M. Matheny, Lynwood, Calif., assignor, by mesne assignments, to American Pipe and Construction Co., Los Angeles, Calif., a corporation of Delaware
Original application July 20, 1956, Ser. No. 599,275, now Patent No. 2,917,820, dated Dec. 22, 1959. Divided and this application Mar. 20, 1959, Ser. No. 800,727
11 Claims. (Cl. 140—2)

This invention has to do with the placing of a steel reinforced cement mortar lining in a pipeline in place in the ground. The application is a division of my application Serial No. 599,275 filed July 20, 1956, now Patent No. 2,917,820, issued Dec. 22, 1959.

In recent years it has been found to be economical to line old pipelines with cement mortar to prolong their period of service. The common method of doing this is to first clean the interior of the pipe and subsequently apply a thin lining of cement mortar to the inner wall of the pipe. It is often found that old steel or iron pipelines have become so corroded and rusted that they require additional strength and reinforcement beyond that which is supplied by an unreinforced cement lining. It is also true that there are many instances where it would be advantageous to be able to provide a metal reinforcing means against the wall of a tunnel, earth bore hole or the like, and subsequently to cover this and line the bore or tunnel with cement mortar.

It is therefore an object of my invention to provide novel apparatus for the purpose of applying reinforcement means within a pipeline, tunnel, bore hole or the like in the form of a helically wound steel wire of appropriate dimensions and with desired spacing between turns.

It is a particular object of the invention to provide a machine or apparatus for applying wire tightly against the inner wall of a pipeline, tunnel, bore or other object by coiling the wire firmly against the interior thereof.

These and other objects will be apparent from the drawings and the following description. Referring to the drawings:

FIG. 1 is an elevational view of apparatus embodying the invention shown within a section of a pipeline, the pipe being broken away;

FIG. 2 is a plan view of the apparatus of FIG. 1;

FIG. 3 is an end elevational view of the apparatus and a sectional view of the pipe on line 3—3 of FIG. 1;

FIG. 4 is a fragmentary longitudinal sectional view through a portion of the apparatus of FIG. 1;

FIG. 5 is an enlarged detailed view of a portion of the wire-feeding head, in the same plane as FIG. 3;

FIG. 6 is a fragmentary sectional view of a section of pipe in which there has been placed a lining of reinforcing wire;

FIG. 7 is a greatly enlarged view in detail showing the convolutions of the wire welded to the pipe section;

FIG. 8 is a fragmentary sectional view showing a wire lining in a concrete or nonmetal pipe with the wire convolutions welded to a bar; and FIG. 9 is a sectional view of a portion of a completed lined pipe.

More particularly describing the invention, my method of relining pipe in general comprises the application of wire reinforcement within the pipe in the form of a helical coil with the turns against the interior of the pipe and the subsequent lining of the pipe by covering the reinforcement with cement mortar to provide a reinforced cement lining.

Referring now to FIGS. 1–5, I shall first describe the preferred form of apparatus for applying the helically coiled wire reinforcement to the pipe. In these figures 11 generally designates a pipe section which is shown by way of illustration, and this may be an old corroded and weakened section of pipe forming part of a pipeline in place in the ground. Within the pipe section 11 is shown apparatus in the form of a machine, designated 12, the function of which is to line the pipe with a reinforcing means in the form of helically disposed turns of wire 14 in tight engagement with the interior of the pipe.

The drawings are to some extent diagrammatic in that elements which are well known in the art are illustrated in outline only. The machine includes a carriage 16 providing a platform 17. The carriage has a wheel 18 at its forward end mounted in a pivotally mounted yoke 19 provided with a steering lever 20. The frame 16 is also provided with two rear wheels 22 which may be journaled in any conventional manner. These are adapted to be driven by a motor 23 through a suitable gear reduction and variable speed transmission 24 and a drive train, a portion of which is shown at 25. It is contemplated that the machine be supplied with electrical current by means of a cable or other conductors leading from a source ahead of the machine. On the machine there is shown a panel, designated 27, which carries various conventional control elements for regulating the speed of motor 23 and controlling other electrical components of the machine.

The frame includes four vertical posts, designated 30, and these support a vertically adjustable tubular body 31 upon bolts 32 which pass through ears 33 on the body. The ends of the bolts or rods 32 extend through slots 34 in the posts 30 and are provided with nuts at one end for tightening the structure in place.

Mounted concentrically within the body 31 is an elongated wire-feed tube, designated 35, through which the wire 14 passes. The tube 35 is held in place by end walls 36 and 37, respectively, provided in the body 31.

Rotatively mounted upon the tube 35 beyond the rearward end of the body 31 is a drum or rotor 40 which supports a motor 41 for the wire-feed mechanism.

The motor 41 is preferably electric of the variable speed type and is used to drive the wire-feed rollers comprising a first pair of rollers 45 and a second pair of rollers 46. Any suitable means may be used for supplying current to the motor such as conductor rings 47 supported upon insulation 48 on the tube 35 together with brushes 50 connected to the motor. An electrical cable 51 may lead to a source of electric current and be connected into a junction box or housing 52 from which wires (not shown) may connect to the rings 47.

The sets or pairs of feed rollers are mounted upon a head or framework designated generally 57 which includes a post 58 mounted upon a frame member 60 which is rigidly carried upon rotor 40. The motor 41 can be operably connected to the two pairs of wire-feed rollers by any suitable means such as is within the knowledge of any one skilled in the art. For this purpose I merely show a gear box 61, shaft 62, gear case 63, shafts 64 and 65 and gear case 66.

An arm 70 is pivotally mounted at 71 on the post 58 and carries a wire guide roller 72 at its outer end over which the wire passes. The arm 70 is biased upwardly of the post and toward the wall of the pipe by a coil spring 73 supported upon a bracket 74, the movement of the arm being limited by the bolt 75 and nuts 76. An additional wire guide means is carried upon a short arm 78 on the post and this includes the roller 80 and wire retaining element 81.

It will be apparent that the motor 41 through the medium of the two pairs of wire feed rollers 45 and 46 draws the wire through tube 35 and forces it outwardly toward and against the wall of the pipe, where it is rolled thereagainst by the roller 72. Through the force of reaction as the wire is fed against the pipe, the head 57 is thereby caused to rotate in the direction of the arrow shown in FIG. 5.

A braking action is provided for the purpose of offering resistance to this rotation of the head and, while various means may be used to accomplish this, I prefer to accomplish this by dynamic braking. Thus, on the member 31 I mount a dynamotor or equivalent device, designated 85, and connect this to the rotor 40 by means of the gears 86 and 87, the latter being mounted upon the rotor. By suitable regulation a desired amount of braking action or resistance can be offered to the turning of the rotor and wire feed head.

It will be apparent that by varying the speed of the motor 41 and by varying the speed at which the carriage is advanced I may control the spacing between the turns 14 of the applied reinforcement wire and am thereby enabled to wind the turns of wire as close together as required for a given pipe.

As the machine advances I prefer to tack-weld or spot-weld some of the turns of the wire reinforcement to the pipe for the purpose of holding them firmly in place until they are later covered by the cement mortar. For this purpose the machine may be provided with an electrode roller 90 carried on a rod 91 telescopically received in mounting 92 and urged outwardly into contact with the wire by a spring 93. The roller may be insulated conventionally by means not shown and connected by conductor 94 into an electric welding circuit means carried on the carriage. A conductor ring and brush assembly (not shown) may be provided between the rotatable head and a stationary part of the carriage.

Referring again to the method and particularly FIGS. 6 and 7 of the drawing, assuming that the pipe section or pipe has been cleaned, in my method I first line the pipe interiorly with the reinforcement wire which is wound in the form of turns 14 which are helically disposed. Also, these are preferably tack- or spot-welded to the pipe at suitable intervals as indicated in FIG. 7 where the weld has been designated 95. In instances where the pipe being lined is not of metal and may be of concrete or the like as designated 100 in FIG. 8, I prefer to lay a bar of metal 101 along the bottom of the pipe for the purpose of later being able to weld various turns of the winding thereto to hold the same in place, as indicated by welds 103.

After the reinforcement has been placed in the pipe, a coating 105 of cement mortar is applied to cover the reinforcement and the inner surface of the pipe. In FIG. 9 I show a completed pipe.

Although I have shown and described the process and apparatus in connection with the lining of steel pipe, it will be apparent that the same method and apparatus are useful for lining bores, tunnels and the like in earth, concrete or other substances, and that various changes and modifications may be made in the apparatus without departing from the scope of the invention.

I claim:

1. In apparatus for winding a helically coiled wire reinforcement inside a pipe or the like, a carriage adapted to be advanced through the pipe, a wire-feed head means mounted on said carriage for rotation about an axis coincident with the axis of the pipe, and wire-feed means carried by said head means for advancing wire toward and against the inner surface of the pipe such that the wire leaves said head means at a region spaced radially of the axis of rotation of said head means whereby, as said wire is forced against said pipe, said head means is caused to rotate by reaction.

2. In apparatus for winding a helically coiled wire reinforcement means inside a pipe or the like, a carriage adapted to be advanced through the pipe, a wire-feed heads means mounted on said carriage for rotation about an axis coincident with the axis of the pipe, wire-feed means carried by said head means for advancing wire toward and against the inner surface of the pipe such that the wire leaves said head means at a region spaced radially of the axis of rotation of said head means whereby, as said wire is forced against said pipe, said head means is caused to rotate by reaction, and means for resisting rotation of said head means.

3. Apparatus as set forth in claim 2 in which the means for resisting rotation of said head means comprises dynamic braking means.

4. Apparatus as set forth in claim 2 in which said carriage is self-propelled.

5. In apapratus for winding a helically coiled wire reinforcement inside a pipe or the like, a carriage adapted to be advanced through the pipe, a wire-feed head means mounted on said carriage for rotation about an axis adapted to coincide with the axis of the pipe, wire-feed means carried by said head means for feeding wire toward said pipe from a point spaced radially of the axis of rotation of said head means and at an angle with respect to a radius line from said axis to said point, whereby, said head means is caused to rotate by reaction, and means for resisting rotation of said head means.

6. In apparatus for winding a helically coiled wire reinforcement inside a pipe or the like, a carriage adapted to be advanced through the pipe, a wire-passing tube mounted horizontally on said carriage, a wire-feed head means mounted at one end of said tube to rotate about the axis of the tube, motor-driven wire-feed means carried by said head means for feeding wire toward the pipe, and means carried by said carriage for resisting rotation of said head.

7. Apparatus as set forth in claim 6 in which said wire-feed head means is mounted for rotation on said tu be.

8. Apparatus as set forth in claim 6 in which said tube is vertically adjustably mounted on said carriage.

9. In apparatus for winding a helically coiled wire reinforcement inside a pipe or the like, a carriage adapted to be advanced through the pipe, a horizontally disposed wire-passing tube mounted on said carriage and extending longitudinally thereof, said tube projecting beyond the rearward end of said carriage, a rotor rotatably mounted on the projecting portion of said tube, a motor mounted on said rotor, a feed head frame mounted on said rotor, wire feed rolls carried by said frame, drive means operatively connecting said motor and said feed rolls, and means carried by said carriage for resisting rotation of said rotor.

10. Apparatus as set forth in claim 9 in which said wire-passing tube is mounted for vertical adjustment.

11. Apparatus as set forth in claim 9 in which said carriage is self-propelled.

References Cited in the file of this patent

UNITED STATES PATENTS

| | | |
|---|---|---|
| 1,198,351 | Ripley | Sept. 12, 1916 |
| 1,395,299 | Heany | Nov. 1, 1921 |
| 2,480,180 | Bolton | Aug. 30, 1949 |
| 2,772,701 | Brune | Dec. 4, 1956 |